United States Patent
Maruyama et al.

(10) Patent No.: US 12,434,589 B2
(45) Date of Patent: Oct. 7, 2025

(54) DIAGNOSTIC SYSTEM FOR BATTERY MODULE AND VEHICLE

(71) Applicant: TOYOTA JIDOSHA KABUSHIKI KAISHA, Toyota (JP)

(72) Inventors: Yuko Maruyama, Toyota (JP); Shohei Matsuoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 290 days.

(21) Appl. No.: 18/057,297

(22) Filed: Nov. 21, 2022

(65) Prior Publication Data

US 2023/0249572 A1    Aug. 10, 2023

(30) Foreign Application Priority Data

Feb. 4, 2022  (JP) ................. 2022-016410

(51) Int. Cl.
| | |
|---|---|
| *B60L 53/65* | (2019.01) |
| *B60L 50/64* | (2019.01) |
| *G07C 5/08* | (2006.01) |
| *H01M 10/42* | (2006.01) |
| *H01M 10/44* | (2006.01) |
| *H01M 10/48* | (2006.01) |

(52) U.S. Cl.
CPC ............ *B60L 53/65* (2019.02); *B60L 50/64* (2019.02); *G07C 5/0808* (2013.01); *G07C 5/0816* (2013.01); *H01M 10/4257* (2013.01); *H01M 10/441* (2013.01); *H01M 10/482* (2013.01); *H01M 2220/20* (2013.01)

(58) Field of Classification Search
CPC ....... B60L 50/64; B60L 53/65; G07C 5/0808; G07C 5/0816; H01M 10/4257; H01M 10/441; H01M 10/482; H01M 2220/20
See application file for complete search history.

(56) References Cited

U.S. PATENT DOCUMENTS

| | | | |
|---|---|---|---|
| 6,850,038 B2* | 2/2005 | Arai ..................... | H01M 10/48 320/132 |
| 7,573,237 B2* | 8/2009 | Cutrona ............. | G01R 31/3835 320/132 |
| 9,500,713 B1* | 11/2016 | Ghantous ........... | G01R 31/3835 |
| 9,685,807 B2* | 6/2017 | Nakao ................ | G01R 31/374 |
| 10,151,801 B2* | 12/2018 | Gelso .................... | B60L 58/22 |
| 2016/0218528 A1* | 7/2016 | Sugeno .................. | B60L 53/64 |
| 2017/0010327 A1* | 1/2017 | Nishiguchi ........ | G01R 31/3835 |

(Continued)

FOREIGN PATENT DOCUMENTS

| | | |
|---|---|---|
| JP | 2012174367 A | 9/2012 |
| JP | 2012174487 A | 9/2012 |

(Continued)

*Primary Examiner* — Redhwan K Mawari
*Assistant Examiner* — Kai Nmn Wang
(74) *Attorney, Agent, or Firm* — SoraIP, Inc.

(57) ABSTRACT

A diagnostic system for a battery module including a plurality of electric cells includes a displacement detector configured to detect a displacement of at least one of the electric cells during charging, and an electronic control unit configured to determine whether the battery module is a genuine product. The electronic control unit is configured to determine whether the battery module is the genuine product based on the displacement detected by the displacement detector.

11 Claims, 6 Drawing Sheets

(56) References Cited

U.S. PATENT DOCUMENTS

| | | | | |
|---|---|---|---|---|
| 2017/0146609 A1* | 5/2017 | Uchino | ............... | H01M 10/486 |
| 2018/0198289 A1* | 7/2018 | Sugeno | ............ | H02J 7/007182 |
| 2018/0301755 A1* | 10/2018 | Kurakane | ........... | H01M 50/449 |
| 2018/0313906 A1* | 11/2018 | Takahashi | ........... | G01R 31/3842 |
| 2020/0126516 A1* | 4/2020 | Kubo | ................. | G01R 31/3646 |
| 2022/0252676 A1* | 8/2022 | Choi | ................. | H01M 10/4285 |

FOREIGN PATENT DOCUMENTS

| | | | |
|---|---|---|---|
| JP | 2020114121 A | | 7/2020 |
| JP | 2020169932 A | * | 10/2020 |
| JP | 2021052463 A | | 4/2021 |
| JP | 2022076670 A | | 5/2022 |
| JP | 2022076672 A | | 5/2022 |

* cited by examiner

DIAGNOSTIC SYSTEM FOR BATTERY MODULE AND VEHICLE

CROSS-REFERENCE TO RELATED APPLICATION

This application claims priority to Japanese Patent Application No. 2022-016410 filed on Feb. 4, 2022, incorporated herein by reference in its entirety.

BACKGROUND

1. Technical Field

The present disclosure relates to a diagnostic system for a battery module, and more particularly, to a diagnostic system for determining whether a battery module is a genuine product, and a vehicle including the diagnostic system.

2. Description of Related Art

In recent years, vehicles including battery packs, such as hybrid electric vehicles and battery electric vehicles, have become widespread. With respect to in-vehicle battery packs, counterfeit products manufactured by unauthorized manufacturers may be distributed. In addition, genuine products may be modified. These non-genuine products (counterfeit or third-party products) may use inferior batteries or may be inadequate for the performance required by vehicles. Therefore, there has been proposed a technology for determining whether a battery pack (battery module) is a genuine product or a non-genuine product.

For example, Japanese Unexamined Patent Application Publication No. 2012-174487 (JP 2012-174487 A) discloses a battery pack (battery module). A control unit in this battery pack determines that the battery is not a genuine product when a difference between a weight of the battery measured in an initial state (first weight) and a current weight of the battery (second weight) is larger than a threshold value.

SUMMARY

In JP 2012-174487 A, whether the battery is a genuine product is determined based on the weight of the battery. Therefore, there is a possibility that the diagnosis (i.e., determination) cannot appropriately be made when the target of diagnosis is a battery that has a weight substantially equal to the weight of a genuine product but is different from the genuine product in a characteristic other than the weight (may include a shape, a structure, a material, etc.).

The present disclosure provides a technology that determines whether a battery module is a genuine product even if the genuine product and a non-genuine product are substantially equal to each other in terms of the weight of the battery.

A first aspect of the present disclosure relates to a diagnostic system for a battery module including a plurality of electric cells. The diagnostic system includes a displacement detector configured to detect a displacement of at least one of the electric cells during charging, and an electronic control unit configured to determine whether the battery module is a genuine product. The electronic control unit is configured to determine whether the battery module is the genuine product based on the displacement detected by the displacement detector.

The electronic control unit may be configured to calculate a displacement amount of the at least one electric cell during the charging based on the displacement detected by the displacement detector, and determine that the battery module is the genuine product when the calculated displacement amount is in a set range including a magnitude of a displacement amount in the genuine product during the charging. In this way, the electronic control unit may be configured to determine whether the battery module is the genuine product based on the displacement detected by the displacement detector.

The electronic control unit may be configured to calculate a slope of a displacement amount that is a magnitude of the displacement amount with respect to charging electric energy based on the displacement detected by the displacement detector, and determine that the battery module is the genuine product when the calculated slope is in a set range including a magnitude of a slope of a displacement amount in the genuine product during the charging. In this way, the electronic control unit may be configured to determine whether the battery module is the genuine product based on the displacement detected by the displacement detector.

With the configurations described above, whether the battery module is the genuine product is determined based on the displacement of at least one of the electric cells during the charging. Therefore, it is possible to determine whether the battery module is the genuine product even if the weights of the genuine product and a non-genuine product are substantially equal to each other.

In the above aspect of the present disclosure, the battery module may be an assembled battery including a stack of the electric cells. Each of the electric cells may include an electrode body and a case that houses the electrode body. The displacement detector may be configured to detect a change in a thickness of the case of the at least one electric cell, as the displacement.

With this configuration, the change in the thickness of the case of the at least one electric cell is detected as the displacement of the at least one electric cell. Therefore, the displacement of the at least one electric cell during the charging can be detected accurately.

A vehicle according to a second aspect of the present disclosure is a vehicle including a battery module including a plurality of electric cells, and the diagnostic system according to the first aspect. The battery module is configured to perform external charging in which the battery module is charged by using electric power supplied from an external power supply. The electronic control unit of the diagnostic system is configured to determine whether the battery module is the genuine product during the external charging.

With this configuration, when the external charging of the battery module mounted on the vehicle is performed, the electronic control unit determines whether the battery module is the genuine product. Therefore, the diagnosis can be made (i.e., the determination can be made) periodically, and whether the battery module is the genuine product can be determined more securely.

A vehicle according to a third aspect of the present disclosure is a vehicle including a battery module including a plurality of electric cells, and the diagnostic system according to the first aspect. The vehicle includes a device configured to issue an alert when the electronic control unit of the diagnostic system determines that the battery module is not the genuine product.

With this configuration, a user of the vehicle can be informed that a non-genuine battery module is mounted.

According to the aspects of the present disclosure, it is possible to determine whether the battery module is the genuine product even if the genuine product and the non-genuine product are substantially equal to each other in terms of the weight of the battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. The same or corresponding portions are denoted by the same signs throughout the drawings, and description thereof will not be repeated.

In the following embodiment, description will be given about an exemplary configuration in which a "diagnostic system for battery module" according to the present disclosure is mounted on a vehicle. The application of the "diagnostic system for battery module" according to the present disclosure is not limited to the vehicle, and "diagnostic system for battery module" according to the present disclosure may be, for example, stationary.

System Configuration

Figure 1:
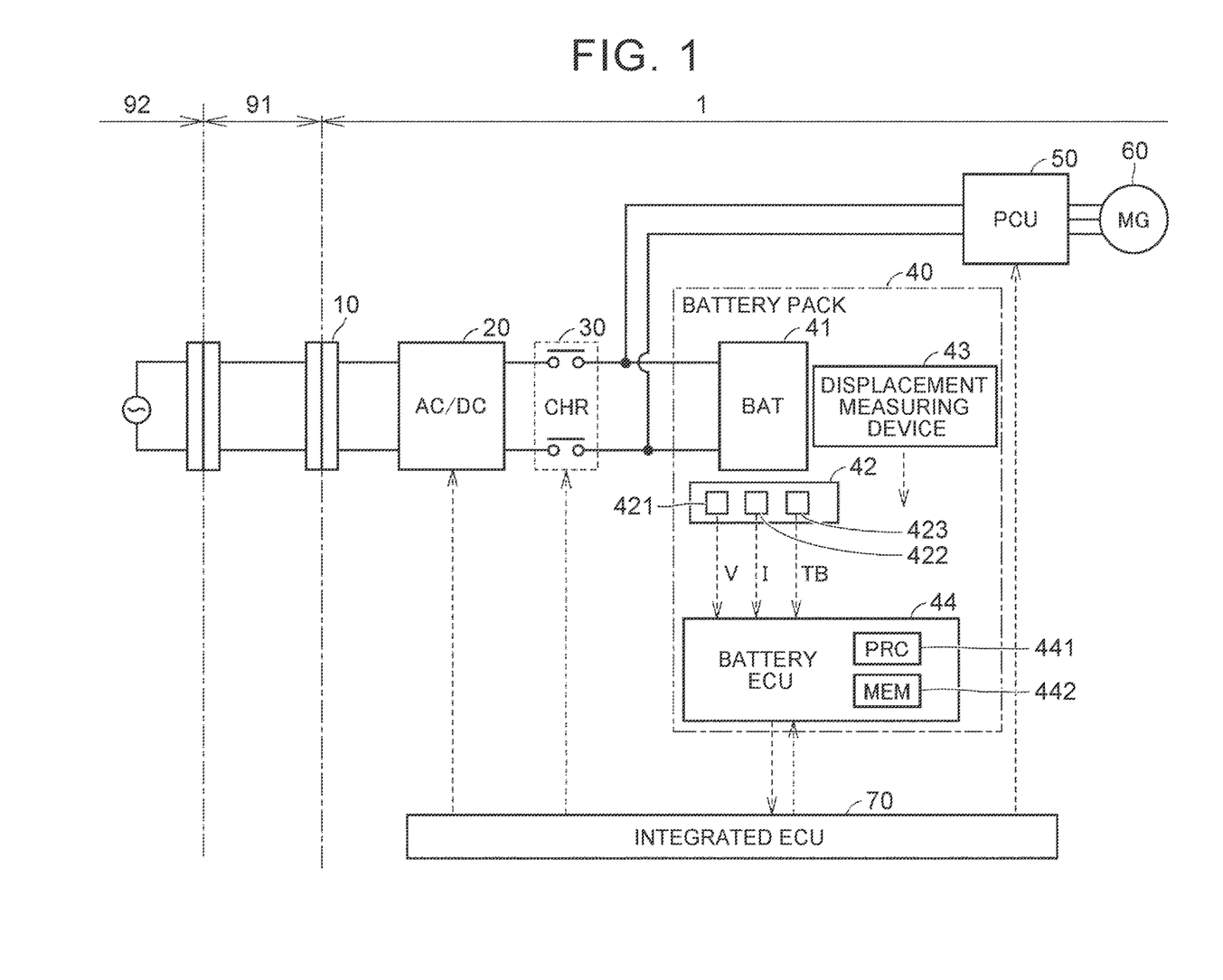
FIG. 1 is a diagram schematically showing an overall configuration of a vehicle including a diagnostic system for a battery module according to an embodiment.

FIG. 1 is a diagram schematically showing an overall configuration of the vehicle including the diagnostic system for a battery module according to the present embodiment. A vehicle 1 is a battery electric vehicle (BEV) in the present embodiment. The kind of the vehicle 1 is not limited to this kind as long as the vehicle includes a battery pack. The vehicle 1 may be a hybrid electric vehicle (HEV), a plug-in hybrid electric vehicle (PHEV), or a fuel cell electric vehicle (FCEV).

The vehicle 1 includes an inlet 10, an alternating current (AC)-direct current (DC) converter 20 (that is referred to as "AC/DC" in FIG. 1), a charge relay (CHR) 30, a battery pack 40, a power control unit (PCU) 50, a motor generator (MG) 60, and an integrated electronic control unit (ECU) 70. The battery pack 40 includes an assembled battery 41, a monitoring unit 42, a displacement measuring device 43, and a battery ECU 44. The battery pack 40 is an example of the "diagnostic system for battery module" according to the present disclosure. The battery ECU 44 is an example of a "diagnostic device" of the present disclosure.

The inlet 10 is configured such that a charge connector provided at the distal end of a charge cable 91 can be inserted in the inlet 10. The vehicle 1 and an external power supply (for example, a system power supply) 92 installed outside the vehicle 1 are electrically connected via the charge cable 91. The vehicle 1 is capable of "external charging" in which the assembled battery 41 is charged by using electric power supplied from the external power supply 92.

The AC-DC converter 20 is electrically connected between the inlet 10 and the charge relay 30. The AC-DC converter 20 converts alternating current (AC) power supplied from the external power supply 92 via the inlet 10 into direct current (DC) power, and outputs the DC power to the charge relay 30. The AC-DC converter 20 converts DC power supplied from the assembled battery 41 (or the PCU 50) via the charge relay 30 into AC power, and outputs the AC power to the inlet 10.

The charge relay 30 is electrically connected to a power line connecting the AC-DC converter 20 and the assembled battery 41. The charge relay 30 is opened or closed in response to a control signal from the integrated ECU 70.

The assembled battery 41 stores electric power for driving the motor generator 60, and supplies the electric power to the motor generator 60 through the PCU 50. The assembled battery 41 is charged with electric power output from the AC-DC converter 20 during the external charging. When the motor generator 60 generates electric power (during regenerative power generation or the like), the assembled battery 41 is charged by receiving the generated electric power through the PCU 50.

The monitoring unit 42 includes a voltage sensor 421, a current sensor 422, and a temperature sensor 423. The voltage sensor 421 detects a voltage V of the assembled battery 41 (more specifically, a voltage of each cell 81 described later). The current sensor 422 detects a current I input to or output from the assembled battery 41. The temperature sensor 423 detects a temperature TB of the assembled battery 41. Each sensor outputs a signal indicating a detection result or a measurement result to the battery ECU 44.

The battery ECU 44 includes a processor 441 such as a central processing unit (CPU), a memory 442 such as a read only memory (ROM) and a random access memory (RAM), and an input-output port (not shown) through which various signals are input and output.

The battery ECU 44 manages the assembled battery 41 in cooperation with the integrated ECU 70 based on the input of signals from the sensors of the monitoring unit 42 and maps and programs stored in the memory 442. Main processes to be executed by the battery ECU 44 in the present embodiment include a "diagnostic process" for diagnosing (i.e., determining) whether the assembled battery 41 is a genuine product. The diagnostic process executed by the battery ECU 44 will be described later.

The PCU 50 includes, for example, an inverter and a converter (neither of them is shown). The PCU 50 executes bidirectional power conversion between the assembled battery 41 and the motor generator 60 in response to a control signal from the integrated ECU 70.

Examples of the motor generator 60 include a three-phase AC rotary electric machine including permanent magnets embedded in a rotor (not shown). The motor generator 60 rotates a drive shaft by using electric power supplied from the assembled battery 41. The motor generator 60 can generate electric power by regenerative braking. AC power generated by the motor generator 60 is converted into DC power by the PCU 50 to charge the assembled battery 41 with the DC power.

Similarly to the battery ECU 44, the integrated ECU 70 includes a processor, a memory, and an input-output port (none of them are shown). The integrated ECU 70 controls the devices (AC-DC converter 20, charge relay 30, and PCU 50) so that the vehicle 1 is in a desired state based on input of signals from the sensors provided in the vehicle 1 and maps and programs stored in the memory. For example, the integrated ECU 70 controls charging and discharging of the assembled battery 41 by controlling the AC-DC converter 20 and/or the PCU 50. The ECUs mounted on the vehicle 1 may be integrated or divided for each function as appropriate.

Structure of Assembled Battery

Figure 2:
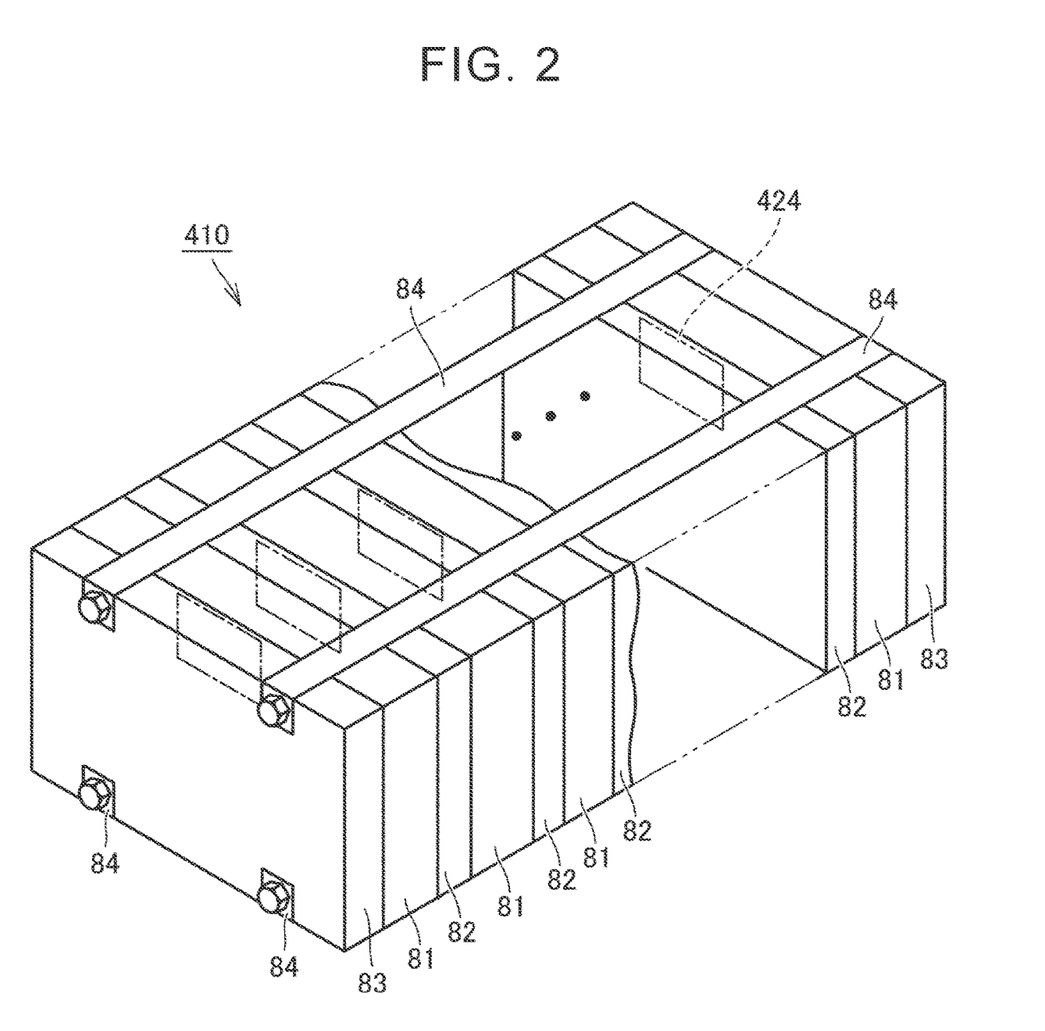
FIG. 2 is a perspective view schematically showing a structure of an assembled battery according to the embodiment.

FIG. 2 is a perspective view schematically showing a structure of the assembled battery 41 according to the present embodiment. The assembled battery 41 includes a plurality of stacks 410 (battery modules). The stacks 410 may be connected in series or in parallel. FIG. 2 shows one of the stacks 410 as a representative. The assembled battery 41 may be composed of one stack 410.

The stack 410 (battery module) includes a plurality of cells (electric cells) 81, a plurality of resin frames 82, a pair of end plates 83, and a pair of restraint bands 84. In the stack 410, a stacked body is formed by stacking the cells 81 and the resin frames 82.

Each of the cells 81 is a secondary battery such as a lithium ion battery or a nickel metal hydride battery. The number of cells in the stack 410 is not particularly limited. Each of the cells 81 has a common structure, and the stacked cells 81 are electrically connected in series.

Each of the resin frames 82 is arranged between two cells 81 adjacent to each other in a stacking direction. The end plates 83 are respectively arranged at one end and the other end of the stacked body in the stacking direction. The end plates 83 are arranged such that the stacked body is sandwiched between the end plates 83 from both sides in the stacking direction.

The restraint bands 84 are arranged on the upper surfaces and the lower surfaces of the resin frames 82. The restraint bands 84 restrain the end plates 83 between which the stacked body is sandwiched.

Figure 3:
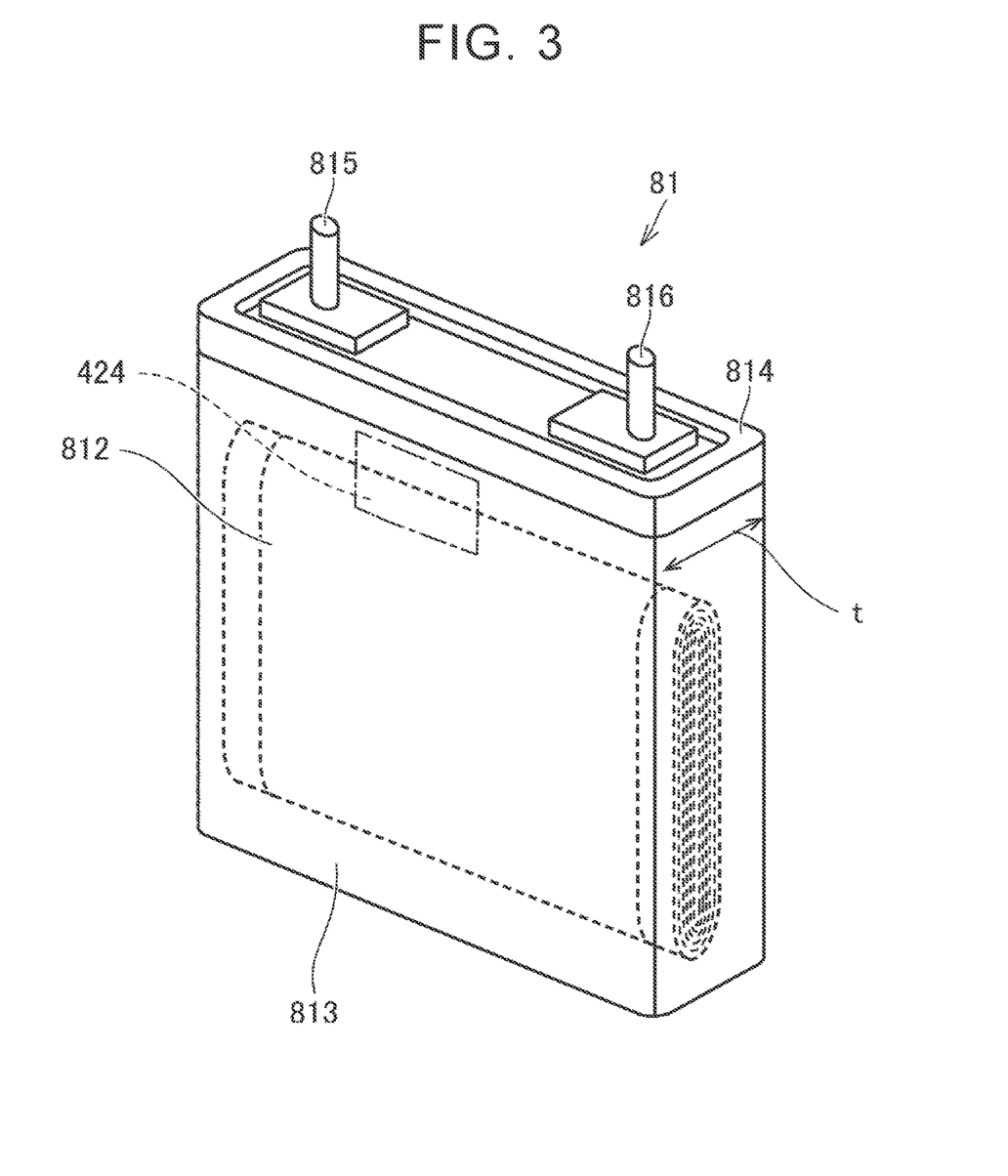
FIG. 3 is a perspective view showing an example of a cell structure.

FIG. 3 is a perspective view showing an example of the structure of the cell 81. In this example, the cell 81 is a lithium ion battery.

The cell (electric cell) 81 is a rectangular cell having a substantially cuboid shape. The cell 81 includes a case 813 that houses an electrode body 812 and a lid 814 that seals the upper surface of the case 813. The lid 814 has a positive electrode terminal 815 and a negative electrode terminal 816. One end of each of the positive electrode terminal 815 and the negative electrode terminal 816 projects outward from the lid 814. The other ends of the positive electrode terminal 815 and the negative electrode terminal 816 are electrically connected to an internal positive electrode terminal and an internal negative electrode terminal (neither of them is shown) inside the case 813, respectively. Although illustration is omitted, two adjacent cells 81 are electrically connected in series by a bus bar.

The electrode body 812 is housed inside the case 813. The electrode body 812 is formed by, for example, stacking a positive electrode sheet and a negative electrode sheet via a separator and further winding these components into a tubular shape. An electrolytic solution is held on the positive electrode sheet, the negative electrode sheet, the separator, and the like. A stacked body may be adopted as the electrode body 812 in place of the wound body.

Referring to FIG. 1, the battery pack 40 includes the displacement measuring device 43. The displacement measuring device 43 may be, for example, a laser displacement meter that detects displacements of the stacked cells 81 in a direction of a thickness t (see FIG. 3) of the case 813 (i.e., changes in the thicknesses t) and outputs the detection result to the battery ECU 44.

Displacement of Cell (Electric Cell) 81

In the vehicle 1 configured as described above, the assembled battery 41 in the battery pack 40 deteriorates along with its use or along with an elapse of time. When the deterioration of the assembled battery 41 has proceeded to a considerable extent, it is conceivable to replace the assembled battery 41 with a new assembled battery (or a used assembled battery whose deterioration has not proceeded relatively). At that time, a non-genuine assembled battery such as a counterfeit or third-party product may be selected.

As in JP 2012-174487 A, whether the assembled battery 41 is a genuine product may be diagnosed (i.e., determined) based on the weight of the assembled battery 41. In that case, however, there is a possibility that whether the assembled battery 41 is a genuine product cannot appropriately be determined when the assembled battery 41 is replaced with an assembled battery 41 that has a weight substantially equal to the weight of a genuine product but is different from the genuine product in a characteristic other than the weight (outer cell shape, structure, battery material, etc.).

When the assembled battery 41 is charged, the thickness t of the cell 81 (case 813) increases due to the charging. The amount of increase in the thickness t due to the charging differs depending on a difference in the material of the electrode body (positive electrode or negative electrode) of the cell (electric cell) or the structure of the case. Therefore, the amount of increase in the thickness t during the charging differs between the genuine product and the non-genuine product. In the present embodiment, the displacement of the cell 81 (case 813) during the charging (i.e., a change in the thickness t) is used to determine whether the assembled battery 41 is the genuine product or the non-genuine product.

Figure 4A:
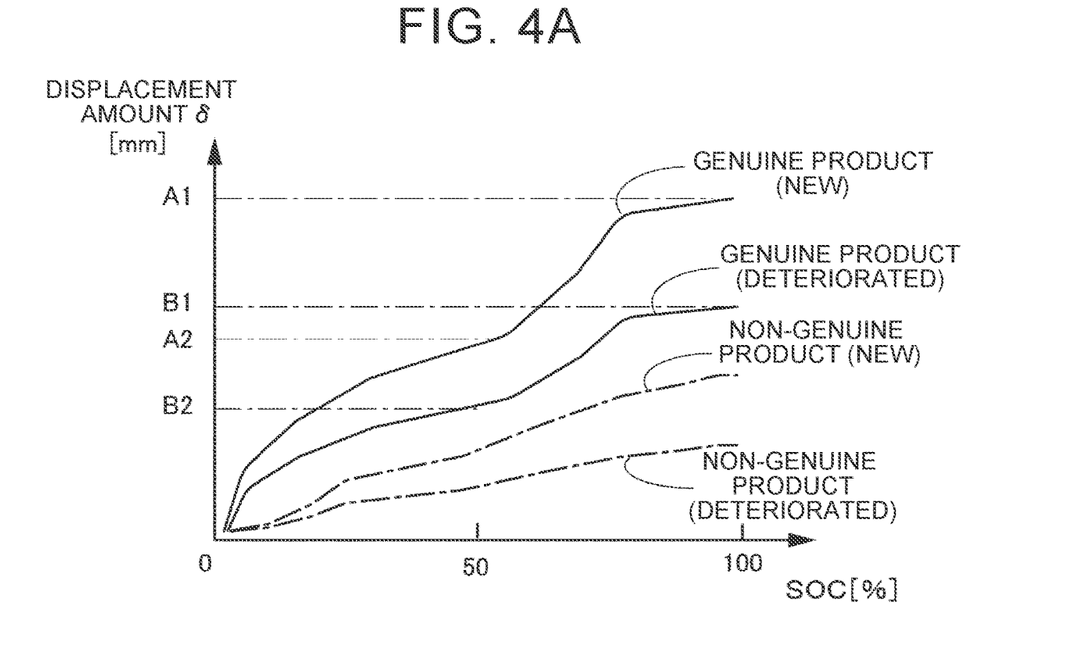
FIGS. 4A and 4B are diagrams illustrating displacements of cells during charging.
Figure 4B:
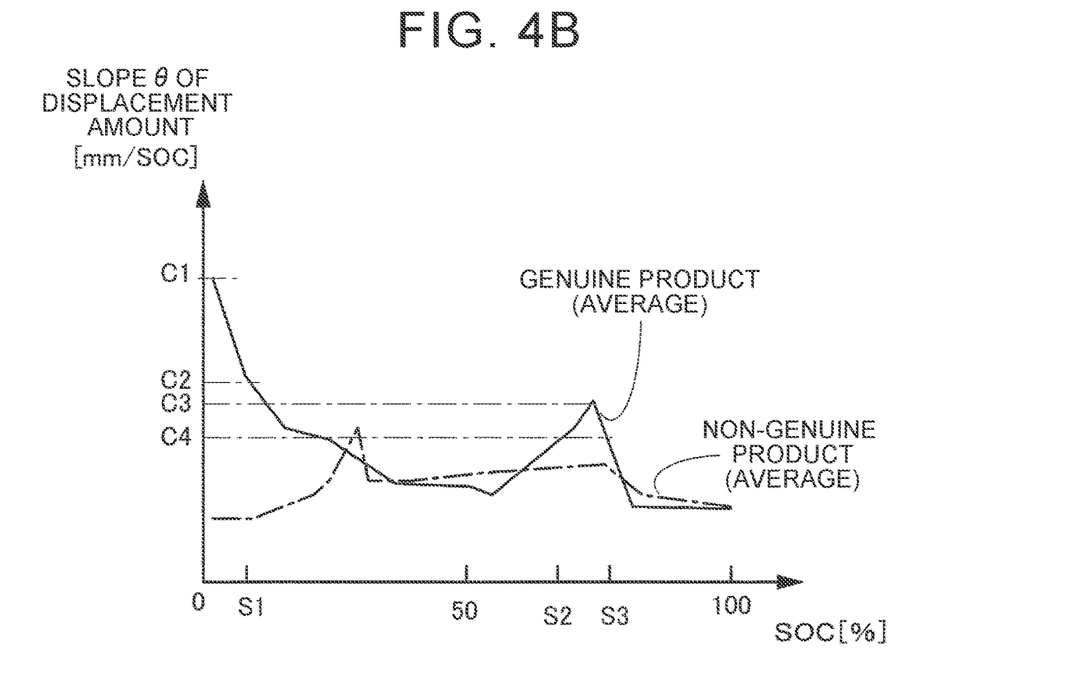

FIGS. 4A and 4B are diagrams illustrating displacements of the cells 81 during the charging. FIG. 4A shows a displacement amount $\delta$ of the cell 81, and FIG. 4B shows a slope $\theta$ of the displacement amount. In FIG. 4A, a vertical axis represents the displacement amount $\delta$, and a horizontal axis represents a state of charge (SOC) of the cell 81 (assembled battery 41). As shown in FIG. 4A, the displacement amount $\delta$ of the cell 81 increases as the SOC increases along with the charging of the assembled battery 41. This is because the thickness t of the cell 81 (case 813) increases (the case 813 swells) as the power storage amount increases due to the charging.

In FIG. 4A, continuous lines indicate displacement amounts $\delta$ in the genuine product when it is new and when it is deteriorated. In the present embodiment, the displacement amount in the genuine product when it is deteriorated is smaller than that when it is new, but the relationships between the displacement amount $\delta$ and the SOC (i.e., the trajectories of the displacement amount $\delta$ with respect to the SOC) are substantially similar to each other. Alternate long and short dash lines indicate examples of displacement amounts $\delta$ in the non-genuine product when it is new and when it is deteriorated. The displacement amounts in the non-genuine product when it is new and when it is deteriorated are smaller than those in the genuine product when it is new and when it is deteriorated. This is because the material of the electrode body (positive electrode or negative electrode) or the structure of the case differs between the genuine product and the non-genuine product.

As shown in FIG. 4A, when the assembled battery 41 (cell 81) is charged from an SOC of 0% to a full charge capacity (for example, an SOC of 95%), the displacement amount δ (0% to 95%) in the genuine product is included in a range of B1 to A1. A set range Th1 is set to "(B1−α) to (A1+α)" in consideration of variations in parts and measurement accuracy. The assembled battery 41 can be determined to be the genuine product in a case where the displacement amount δ (0% to 95%) when the assembled battery 41 is charged from the SOC of 0% to the full charge capacity is in the set range Th1 ((B1−α)≤δ (0% to 95%)≤(A1+α)). The assembled battery 41 can be determined to be the non-genuine product in a case where the displacement amount δ (0% to 95%) when the assembled battery 41 is charged from the SOC of 0% to the full charge capacity is outside the set range Th1 (δ(0% to 95%)< (B1−α) or (A1+α)<δ(0% to 95%)). The symbol "a" represents a margin (permissible value) in consideration of variations.

As shown in FIG. 4A, when the assembled battery 41 is charged from an SOC of 50% to the full charge capacity, the displacement amount δ (50% to 95%) in the genuine product is included in a range of (B1−β2) to (A1−A2). A set range Th2 is set to "(B1−β2−α) to (A1−A2+α)" in consideration of variations in parts and measurement accuracy. The assembled battery 41 can be determined to be the genuine product in a case where the displacement amount δ (50% to 95%) when the assembled battery 41 is charged from the SOC of 50% to the full charge capacity is in the set range Th2 ((B1−β2−α)≤δ (50% to 95%)≤(A1−A2+α)). The assembled battery 41 can be determined to be the non-genuine product in a case where the displacement amount δ (50% to 95%) when the assembled battery 41 is charged from the SOC of 50% to the full charge capacity is outside the set range Th2 (δ(50% to 95%)< (B1−β2−α) or (A1−A2+α)<δ(50% to 95%)).

In FIG. 4B, a vertical axis represents the slope θ of the displacement amount, and a horizontal axis represents the SOC of the cell 81 (assembled battery 41). The slope θ [mm/SOC] of the displacement amount is a gradient of the displacement amount δ shown in FIG. 4A (the magnitude of the displacement amount δ per unit SOC), and corresponds to the magnitude of the displacement amount δ with respect to charging electric energy. In FIG. 4B, a continuous line indicates an average of the slopes of the displacement amounts in the genuine product indicated by the continuous lines in FIG. 4A when it is new and when it is deteriorated, and an alternate long and short dash line indicates an average of the slopes of the displacement amounts of the non-genuine product indicated by the alternate long and short dash lines in FIG. 4A when it is new and when it is deteriorated. As shown in FIG. 4B, the slope θ of the displacement amount differs between the genuine product and the non-genuine product similarly to the displacement amount δ.

With regard to the genuine product of the present embodiment, as shown in FIG. 4B, the slope θ of the displacement amount during charging from the SOC of 0% to an SOC of S1 is C2 to C1, and the slope θ of the displacement amount during charging from an SOC of S2 to an SOC of S3 is C4 to C3. Thus, the slopes θ of the displacement amount in these SOC ranges exhibit values larger than those in the other SOC ranges. Therefore, accurate diagnosis can be made by determining whether the product is the genuine product or the non-genuine product by using the slopes θ of the displacement amount during the charging in these SOC ranges.

For example, a set range Th3 is set to "(C2−β) to (C1+β)". The assembled battery 41 can be determined to be the genuine product in a case where the slope θ of the displacement amount when the assembled battery 41 is charged from the SOC of 0% to the SOC of S1 is in the set range Th3 ((C2−β)≤θ≤(C1+β)). The assembled battery 41 can be determined to be the non-genuine product in a case where the slope θ of the displacement amount when the assembled battery 41 is charged from the SOC of 0% to the SOC of S1 is outside the set range Th3 (θ< (C2−β) or (C1+β)<θ).

For example, a set range Th4 is set to "(C4−β) to (C3+β)". The assembled battery 41 can be determined to be the genuine product in a case where the slope θ of the displacement amount when the assembled battery 41 is charged from the SOC of S2 to the SOC of S3 is in the set range Th4 ((C4−β)≤θ≤(C3+β)). The assembled battery 41 can be determined to be the non-genuine product in a case where the slope θ of the displacement amount when the assembled battery 41 is charged from the SOC of S2 to the SOC of S3 is outside the set range Th4 (θ< (C4−β) or (C3+β)<θ). The symbol "B" represents a margin (permissible value) in consideration of variations.

In this way, it is possible to determine whether the assembled battery 41 is the genuine product or the non-genuine product based on the displacements of the cells 81 during the charging that are detected by the displacement measuring device 43 while the assembled battery 41 is charged.

Diagnostic Process

Figure 5:
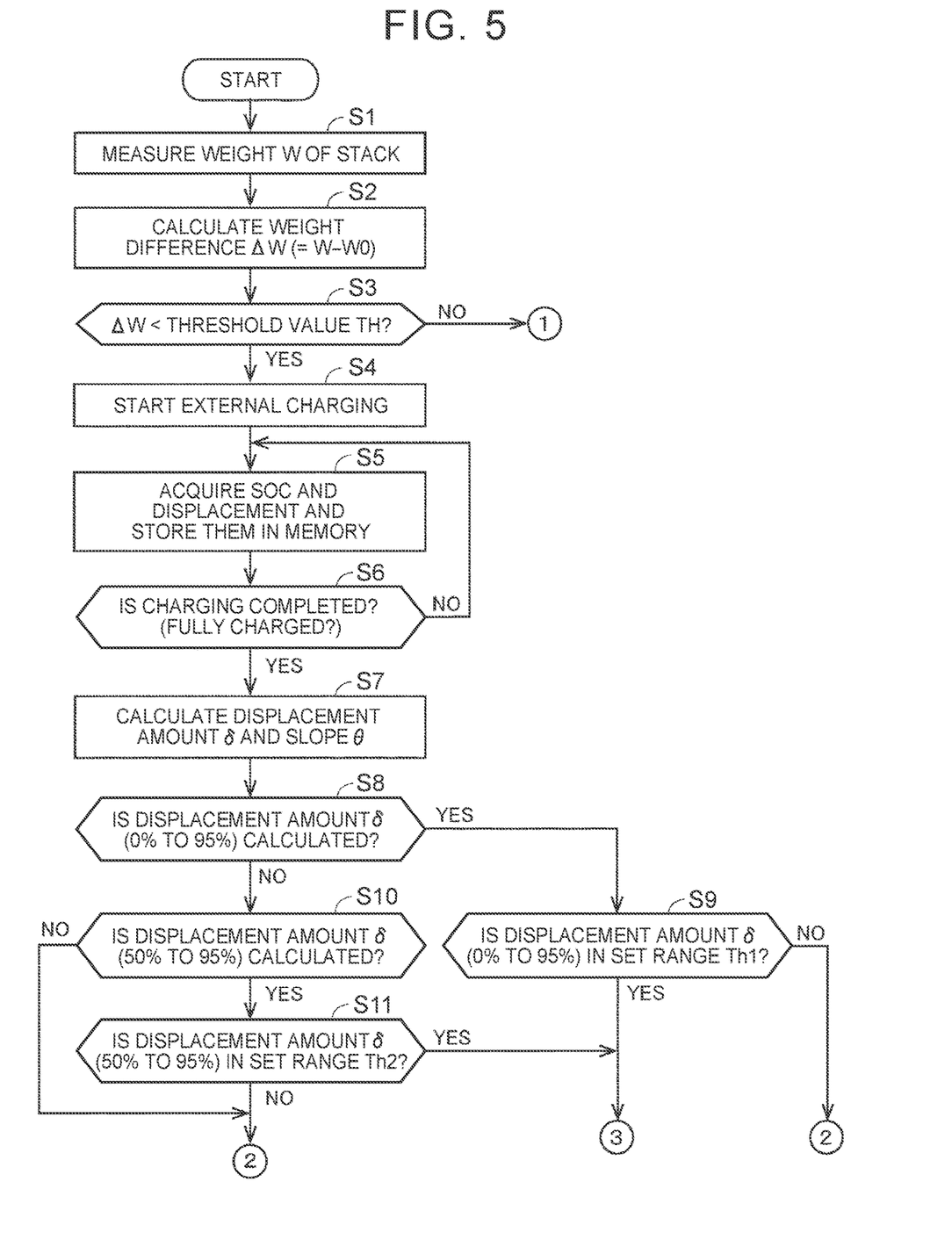
FIG. 5 is a flowchart showing a diagnostic process according to the embodiment.
Figure 6:
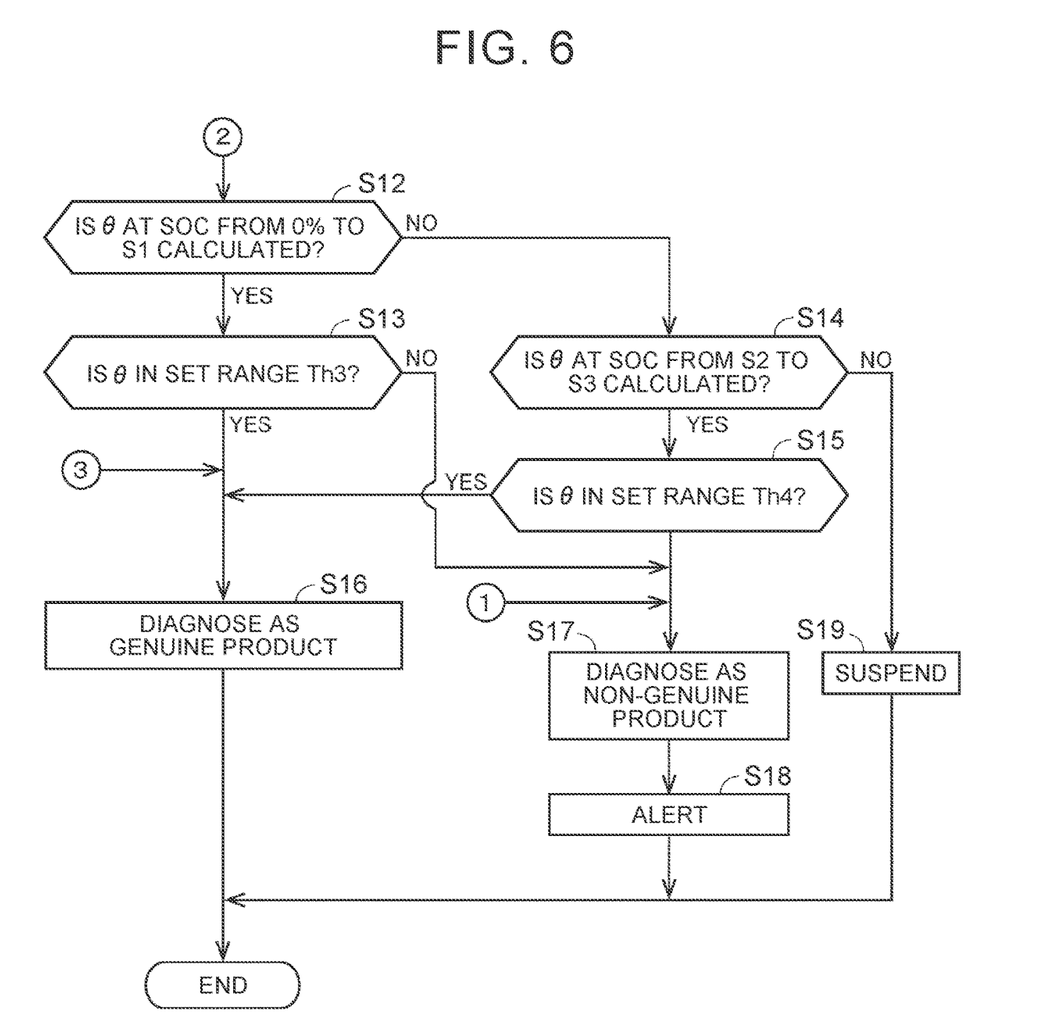
FIG. 6 is a flowchart showing the diagnostic process according to the embodiment.

FIGS. 5 and 6 are flowcharts showing the diagnostic process according to the present embodiment. The process in this flowchart is executed when the assembled battery 41 (stack 410) is replaced. For example, when the assembled battery 41 is replaced, the diagnostic process may be executed together with an initialization process of the battery ECU 44. The steps are implemented by software processing by the battery ECU 44. However, the steps may be implemented by hardware (electric circuit) manufactured in the battery ECU 44. Hereinafter, the term "step" is abbreviated as "S".

In S1 of FIG. 5, the battery ECU 44 measures a weight W of the assembled battery 41 by using a weight sensor (not shown). The memory 442 of the battery ECU 44 stores a weight W0 of the assembled battery 41 (genuine product) in an initial state of the battery pack 40 (factory shipment state etc.) in a non-volatile manner. In S2, the battery ECU 44 calculates a weight difference ΔW (=W−W0) between the weight W measured in S1 and the weight W0 in the initial state. Then, the battery ECU 44 determines whether the weight difference ΔW is smaller than a predetermined threshold value TH (S3). When the weight difference ΔW is equal to or larger than the threshold value TH, a negative determination is made in S3, and the battery ECU 44 determines that the target assembled battery is a non-genuine product (FIG. 6: S17). When the weight difference ΔW is smaller than the threshold value TH, a positive determination is made in S3, and the battery ECU 44 advances the process to S4. For details of the process of S1 to S3, reference can be made to JP 2012-174487 A.

In S4, the external charging of the assembled battery 41 is started. When the charge connector of the charge cable 91 is connected to the inlet 10, the battery ECU 44 closes the charge relay 30 and starts the operation of the AC-DC converter 20, thereby starting the external charging. When the assembled battery 41 is replaced, the assembled battery 41 (cell 81) is charged for the first time. Therefore, there is a high possibility that the assembled battery 41 is charged in a state in which the SOC is substantially 0%.

In S5, the battery ECU 44 acquires an SOC and a displacement of the cell 81 during the external charging, and stores the SOC and the displacement in the memory 442. The SOC may be calculated by using an "open circuit voltage (OCV) method" using an SOC-OCV curve or by using a "current integration method" for integrating charge/discharge currents. The SOC may be acquired by combining the "OCV method" and the "current integration method". With regard to the displacement of the cell 81, for example, a displacement of the case 813 in the direction of the thickness t (i.e., a change in the thickness t) is detected with reference to a position of the case 813 of the cell 81 when the external charging is started, and the SOC and the displacement are stored in the memory 442 in association with each other.

In S6, a determination is made as to whether the assembled battery 41 is fully charged and the external charging is completed. For example, a determination is made that the external charging is completed when the SOC of the assembled battery 41 is equal to or higher than 95% and the assembled battery 41 is fully charged. When the assembled battery 41 is not fully charged, a negative determination is made and the process returns to S5 to continue the external charging and acquire the SOC and the displacement of the cell 81. When the assembled battery 41 is fully charged and the external charging is completed, a positive determination is made and the process proceeds to S7. When the assembled battery 41 is fully charged, the battery ECU 44 opens the charge relay 30 and stops the operation of the AC-DC converter 20, thereby completing the external charging.

In S7, a displacement amount δ and a slope θ of the displacement amount are calculated based on the SOC and the displacement of the cell 81 during the external charging that are stored in the memory 442. In the present embodiment, the displacement measuring device 43 detects the displacements of all the cells 81 in the stack 410 (battery module), and the SOCs and the displacements for all the cells 81 are stored in the memory 442 in association with each other. In the present embodiment, an average of the displacement amounts (displacements) of all the cells 81 is calculated as the displacement amount δ.

In the present embodiment, a displacement amount δ (0% to 95%) during the charging from the SOC of 0% to the full charge capacity and a displacement amount δ(50% to 95%) during the charging from the SOC of 50% to the full charge capacity are calculated. For example, the displacement amount δ (0% to 95%) is calculated by subtracting a detected value of the displacement measuring device 43 at the SOC of 0% from a detected value at the full charge capacity (SOC of 95%). The displacement amount δ (50% to 95%) is calculated by subtracting a detected value of the displacement measuring device 43 at the SOC of 50% from the detected value at the full charge capacity. Therefore, when the SOC at the start of the external charging is, for example, 20%, the displacement amount (0% to 95%) is not calculated.

With regard to the slope θ of the displacement amount, for example, the displacement amount δ that is the average of the displacement amounts of all the cells 81 is calculated, a locus of the displacement amount δ with respect to the SOC is determined, a gradient of the displacement amount δ (the magnitude of the displacement amount δ per unit SOC) is calculated, and a slope θ of the displacement amount δ at each SOC is calculated. Therefore, when the SOC at the start of the external charging is, for example, 20%, the slope θ at the SOC lower than 20% is not calculated.

In S8, a determination is made as to whether the displacement amount δ (0% to 95%) is calculated in S7. When the displacement amount (0% to 95%) is calculated, a positive determination is made and the process proceeds to S9. When the displacement amount (0% to 95%) is not calculated, a negative determination is made and the process proceeds to S10.

In S9, a determination is made as to whether the displacement amount δ (0% to 95%) is in the set range Th1. When the displacement amount δ (0% to 95%) is in the set range Th1 ((B1−α)≤δ (0% to 95%)≤(A1+α)), a positive determination is made and the process proceeds to S16 (FIG. 6). The assembled battery 41 (stack 410) is diagnosed as being a genuine product, that is, the assembled battery 41 (stack 410) is determined to be a genuine product. When the displacement amount δ (0% to 95%) is outside the set range Th1 (δ(0% to 95%)< (B1−α) or (A1+α)<δ(0% to 95%)), a negative determination is made and the process proceeds to S12 (FIG. 6).

In S10, a determination is made as to whether the displacement amount δ(50% to 95%) is calculated in S7. When the displacement amount (50% to 95%) is calculated, a positive determination is made and the process proceeds to S11. When the displacement amount (50% to 95%) is not calculated, a negative determination is made and the process proceeds to S12 (FIG. 6).

In S11, a determination is made as to whether the displacement amount δ(50% to 95%) is in the set range Th2. When the displacement amount δ (50% to 95%) is in the set range Th2 ((B1−β2−α)≤δ (50% to 95%)≤(A1−A2+α)), a positive determination is made and the process proceeds to S16 (FIG. 6). The assembled battery 41 (stack 410) is determined to be a genuine product. When the displacement amount δ (50% to 95%) is outside the set range Th2 (δ(50% to 95%)< (B1−β2−α) or (A1−A2+α)<δ(50% to 95%)), a negative determination is made and the process proceeds to S12 (FIG. 6).

In S12 of FIG. 6, a determination is made as to whether the slope θ at each SOC from 0% to S1 is calculated in S7. When the slope θ at each SOC from 0% to S1 is calculated, a positive determination is made and the process proceeds to S13. When the slope θ at each SOC from 0% to S1 is not calculated, a negative determination is made and the process proceeds to S14.

In S13, a determination is made as to whether all the slopes θ at the SOCs from 0% to S1 are in the set range Th3 (i.e., whether the slope θ at each SOC from 0% to S1 is in the set range Th3). When all the slopes θ at the SOCs from 0% to S1 are in the set range Th3 ((C2−β)≤θ≤(C1+β)), a positive determination is made and the process proceeds to S16. The assembled battery 41 (stack 410) is determined to be a genuine product. When a part or all of the slopes θ at the SOCs from 0% to S1 is/are outside the set range Th3 (θ< (C2−β) or (C1+β)<θ), a negative determination is made and the process proceeds to S17. The assembled battery 41 (stack 410) is diagnosed as being a non-genuine product, that is, the assembled battery 41 (stack 410) is determined to be a non-genuine product.

In S14, a determination is made as to whether the slope θ at each SOC from S2 to S3 is calculated in S7. When the slope θ at each SOC from S2 to S3 is calculated, a positive determination is made and the process proceeds to S15. When the slope θ at each SOC from S2 to S3 is not calculated, a negative determination is made and the process proceeds to S19.

In S15, a determination is made as to whether all the slopes θ at the SOCs from S2 to S3 are in the set range Th4 (i.e., whether the slope θ at each SOC from S2 to S3 is in the set range Th4). When all the slopes θ at the SOCs from S2 to S3 are in the set range Th4 ((C4−β)≤θ≤(C3+β)), a positive determination is made and the process proceeds to S16. The assembled battery 41 (stack 410) is determined to be a genuine product. When a part or all of the slopes θ at the SOCs from S2 to S3 is/are outside the set range Th4 (θ< (C4−β) or (C3+β)<0), a negative determination is made and the process proceeds to S17. The assembled battery 41 (stack 410) is determined to be a non-genuine product.

In S19, since the data on the displacement amount δ and the slope θ calculated in S7 is not sufficient for determining whether the product is a genuine product or a non-genuine product, the diagnosis is suspended and the current process is terminated. In this case, the diagnostic process shown in FIGS. 5 and 6 may be executed when the external charging of the assembled battery 41 is performed after the vehicle 1 has finished traveling.

In S18 following S17, the battery ECU 44 displays an alert message on a human-machine interface (HMI) such as an in-vehicle display to alert a user (driver) of the vehicle 1, and then terminates the process. A malfunction indication lamp (MIL) may be turned ON and a diagnosis code indicating that the assembled battery 41 is a non-genuine product may be written in the memory of the integrated ECU 70. At this time, the integrated ECU 70 may prohibit the vehicle 1 from traveling.

In the present embodiment, when the external charging of the assembled battery 41 (stack 410 (battery module)) is performed, the displacement measuring device 43 detects the displacements of the cells 81 (electric cells), and whether the assembled battery 41 is the genuine product is determined based on the displacements of the cells 81 during the charging. Therefore, it is possible to appropriately determine whether the assembled battery 41 is the genuine product even if the weights of the genuine product and the non-genuine product are substantially equal to each other.

In the present embodiment, the assembled battery 41 is determined to be the genuine product when the displacement amount δ of the cell 81 during the charging is in the set range or the slope θ of the displacement amount of the cell 81 during the charging is in the set range. The assembled battery 41 may be determined to be the genuine product when the displacement amount δ is in the set range and the slope θ of the displacement amount is in the set range. The diagnosis (i.e., determination) may be made by using only one of the displacement amount δ and the slope θ.

In the present embodiment, the displacement amount δ (0% to 95%) during the charging from the SOC of 0% to the full charge capacity and the displacement amount δ(50% to 95%) during the charging from the SOC of 50% to the full charge capacity are used as the displacement amount δ, but the diagnosis may be made by using only one of these displacement amounts δ. The SOC range is set as appropriate depending on the characteristics of the cell (electric cell) by experiments or the like in advance.

In the present embodiment, the slope θ at each SOC from 0% to S1 and the slope θ at each SOC from S2 to S3 are used as the slope θ of the displacement amount, but the diagnosis may be made by using only one of these slopes θ. The SOC range is set as appropriate depending on the characteristics of the cell (electric cell) by experiments or the like in advance.

In the present embodiment, the average of the displacement amounts (displacements) of all the cells 81 is calculated as the displacement amount δ. A maximum value δmax and a minimum value δmin may be selected from among the displacement amounts δ of the cells 81 and a determination may be made that the assembled battery 41 (stack 410 (battery module)) is the genuine product when the maximum value δmax is in a set range and the minimum value δmin is in a set range. As a result, it is possible to accurately determine that the stack 410 (assembled battery 41) is the non-genuine product even if a part of the cells 81 constituting the stack 410 (assembled battery 41) is a non-genuine product.

Similarly, the slopes θ of the displacement amounts of the cells 81 may be calculated and a determination may be made that the assembled battery 41 is the genuine product when the slopes θ of all the cells 81 are in the set range. As a result, it is possible to accurately determine that the stack 410 (assembled battery 41) is the non-genuine product even if a part of the cells 81 constituting the stack 410 (assembled battery 41) is a non-genuine product.

First Modification

In the embodiment described above, the displacement measuring device 43 (for example, the laser displacement meter) is used to detect the displacements of all the cells 81 in the direction of the thickness t of the case 813 (i.e., changes in the thicknesses t). The displacement of the cell 81 may be detected by a strain gauge or the like. For example, as shown in FIGS. 2 and 3, a strain gauge 424 may be attached to the case 813 of the cell 81, and the displacement of the cell 81 may be detected based on an output signal (output voltage) from the strain gauge 424. Not all the cells 81 constituting the assembled battery 41 (stack 410) need to be provided with the strain gauges 424. In other words, at least one of the cells 81 constituting the assembled battery 41 (stack 410) may be provided with the strain gauge 424. That is, the strain gauge 424 that is one example of the displacement detector may detect the displacement of at least one of the cells 81 constituting the assembled battery 41 (stack 410). Even in this case, when the displacement amount δ or slope θ of at least one cell 81 calculated by using the detection signal from the strain gauge 424 is outside the set range, the stack 410 including the at least one cell 81 can be determined to be the non-genuine product. Thus, it is possible to appropriately determine whether the assembled battery 41 is the genuine product or the non-genuine product when the assembled battery 41 is replaced in units of the stack 410.

Second Modification

In the embodiment described above, the diagnostic process in FIGS. 5 and 6 is executed when the assembled battery 41 is replaced. In a second modification, the diagnostic process in FIGS. 5 and 6 is executed every time the external charging of the assembled battery 41 is performed. For example, the battery ECU 44 executes the diagnostic process in FIGS. 5 and 6 when the external charging is started by connecting the charge connector of the charge cable 91 to the inlet 10, closing the charge relay 30, and starting the operation of the AC-DC converter 20.

According to the second modification, whether the assembled battery 41 is the genuine product or the non-genuine product is determined every time the external charging of the assembled battery 41 is performed. Therefore, the frequency of diagnosis increases and the diagnosis (i.e., determination) can be made more securely.

In a case where the vehicle 1 is an externally chargeable PHEV including an internal combustion engine and a motor generator, the diagnostic process in FIGS. 5 and 6 may be executed in the following manner. The vehicle 1 travels in a charge depleting (CD) mode in which the electric power in the assembled battery 41 is positively consumed to reduce the SOC. When the SOC decreases and the traveling in the CD mode is terminated, a forced charging travel is performed until the assembled battery 41 is fully charged. The diagnostic process is executed during the charging in the forced charging travel.

The embodiment disclosed herein shall be construed as illustrative and not restrictive in all respects. The scope of the present disclosure is shown by the claims rather than by the above description of the embodiment, and is intended to include all modifications within the meaning and scope equivalent to those of the claims.

What is claimed is:

1. A vehicle comprising:
    a battery module including a plurality of electric cells, the battery module being configured to be recharged by electric power supplied from an external power supply; and
    a diagnostic system for the battery module, wherein the diagnostic system comprises
        a displacement meter configured to detect a displacement of at least one of the electric cells during the recharging, and
        a processor configured to
            acquire the displacement detected by the displacement meter,
            calculate a displacement amount of the at least one of the electric cells during the recharging and a slope of the displacement amount with respect to a charging electric energy, based on the acquired displacement, and
            determine whether a first displacement amount is calculated, the first displacement amount being the displacement amount from a first predetermined state of charge to a second predetermined state of charge, wherein the processor determines that the battery module is a genuine product when the first displacement amount falls within a first range,
        the processor is further configured to determine, when the first displacement amount is not calculated, whether a first slope of the displacement amount is calculated, the first slope being the slope of the displacement amount with respect to the charging electric energy from a third predetermined state of charge to a fourth predetermined state of charge, wherein the processor determines that the battery module is a genuine product when the first slope falls within a second range.

2. The vehicle according to claim 1, wherein:
    the battery module is an assembled battery including a stack of the electric cells;
    each of the electric cells includes an electrode body and a case that houses the electrode body; and
    the displacement is a change in a thickness of the case of the at least one of the electric cells.

3. The vehicle according to claim 1, wherein:
    the displacement meter is configured to detect the displacements of all the electric cells during the recharging; and
    the processor is configured to
        calculate an average of the displacement amounts of the electric cells during the recharging based on the displacements detected by the displacement meter, and
        determine whether a first average of the displacement amounts is calculated, the first average of the displacement amounts being the average of the displacement amounts from the first predetermined state of charge to the second predetermined state of charge, wherein the processor determines that the battery module is the genuine product when the first average of the displacement amounts falls within the first range.

4. The vehicle according to claim 1, wherein:
    the displacement meter is configured to detect the displacements of all the electric cells during the recharging; and
    the processor is configured to
        calculate an average of the slopes of the displacement amounts with respect to the charging electric energy, based on the displacements detected by the displacement meter, and
        determine whether a second average of the slopes of the displacement amounts is calculated, the second average of the slopes of the displacement amounts being the average of the slopes of the displacement amounts from the third predetermined state of charge to the fourth predetermined state of charge, wherein the processor determines that the battery module is the genuine product when the second average of the slopes of the displacement amounts falls within the second range.

5. The vehicle according to claim 3, wherein:
    the battery module is an assembled battery including a stack of the electric cells;
    each of the electric cells includes an electrode body and a case that houses the electrode body; and
    the displacement amounts are changes in thicknesses of the cases of all the electric cells.

6. The vehicle according to claim 4, wherein:
    the battery module is an assembled battery including a stack of the electric cells;
    each of the electric cells includes an electrode body and a case that houses the electrode body; and
    the displacement amounts are changes in thicknesses of the cases of all the electric cells.

7. The vehicle according to claim 1, further comprising a display device configured to display an alert when the processor of the diagnostic system determines that the battery module is not the genuine product.

8. The vehicle according to claim 1, wherein the genuine product determined by the processor is a battery module manufactured by an authorized manufacturer.

9. The vehicle according to claim 1, wherein the first displacement amount is the displacement amount from a state of charge of 0% to a full charge capacity, or from a state of charge of 50% to a full charge capacity.

10. The vehicle according to claim 1, wherein the processor is further configured to
    acquire a weight and an initial weight of the battery module,
    calculate a weight difference between the weight and the initial weight of the battery module, and
    determine that the battery module is a non-genuine product when the weight difference is equal to or larger than a predetermined threshold value.

11. The vehicle according to claim 1, wherein whether the battery module is the genuine product is determined in a case that the battery module is charged for a first time after the battery module is replaced.

* * * * *